April 14, 1953     L. F. HOPE     2,634,604
COMBINED TORSIOGRAPH AND TORSIOGRAPH CALIBRATION DEVICE Filed Dec. 6, 1947

Inventor
Lawrence F. Hope
By
Spencer, Willito, Helwig & Baillio
Attorneys

Patented Apr. 14, 1953

2,634,604

UNITED STATES PATENT OFFICE 2,634,604

COMBINED TORSIOGRAPH AND TORSIOGRAPH CALIBRATION DEVICE

Lawrence F. Hope, Grosse Pointe Farms, Mich., assignor to General Motors Corporation, Detroit, Mich., a corporation of Delaware Application December 6, 1947, Serial No. 790,202

7 Claims. (Cl. 73—1)

This invention relates to calibrating means and more particularly to self-generated calibrating signal means simultaneously applied to indicating means along with the measuring or testing indications, to provide the operator with an accurate gauge by which to weigh the values of the resultant indices being tested or measured.

There are many instances in which fixed or predetermined calibrations cannot be directly applied to resultant curves obtained by test, but which at best give only approximate values. This is due in the main to the fact that the particular theoretical operation is not too closely followed by the actual results obtained, and therefore the theoretical calibrations do not too closely apply. If some means could be actuated by the apparatus during its own operation to generate calibration signals and these signals applied as indices of position, amplitude, etc., then this would be a simultaneous generation of the test results, and at the same time a superimposed calibration chart, which would be highly accurate inasmuch as it would follow any variation in the actual tests. An illustration only, of one field in which my invention could be highly useful, is the calibration of torsiograph means, which has in the past been quite difficult to check or accurately calibrate. Equipment of this general order is described in one of my earlier patents #2,399,635, issued May 7, 1946, in which case torsional vibration is measured by the device and a resultant curve showing the same appears on the head of a cathode ray oscillograph, the amplitude of the curves there appearing indicating the amount of torsional vibration. A sample curve is shown in Figure 12 of that patent. This unit has ample precision for normal test work, but in cases where extreme accuracy is required, as for instance when the instrument is used to determine the accuracy of other torsiographs, further assurance of accuracy is desirable.

It is, therefore, an object of the present invention to provide means for simultaneously generating calibration indications and normal test indications so that the two are subject to the same practical variations.

It is a further object of my invention to provide apparatus capable of producing calibration indications simultaneously with actual test curves obtained from test equipment.

It is a still further object of my invention to provide calibration indications which can serve as standards against which other test runs being made on equivalent apparatus simultaneously can be checked.

Another, and more specific, object of the invention is to provide apparatus in which a cathode ray oscilloscope may be utilized to show torque displacements of a test specimen, and to exhibit on the screen, calibrating indications simultaneously with the test data.

With these and other objects in view which will become apparent as the specification proceeds, my invention will be best understood by reference to the following specification and claims and the illustrations in the accompanying drawings, in which:

Figure 1:
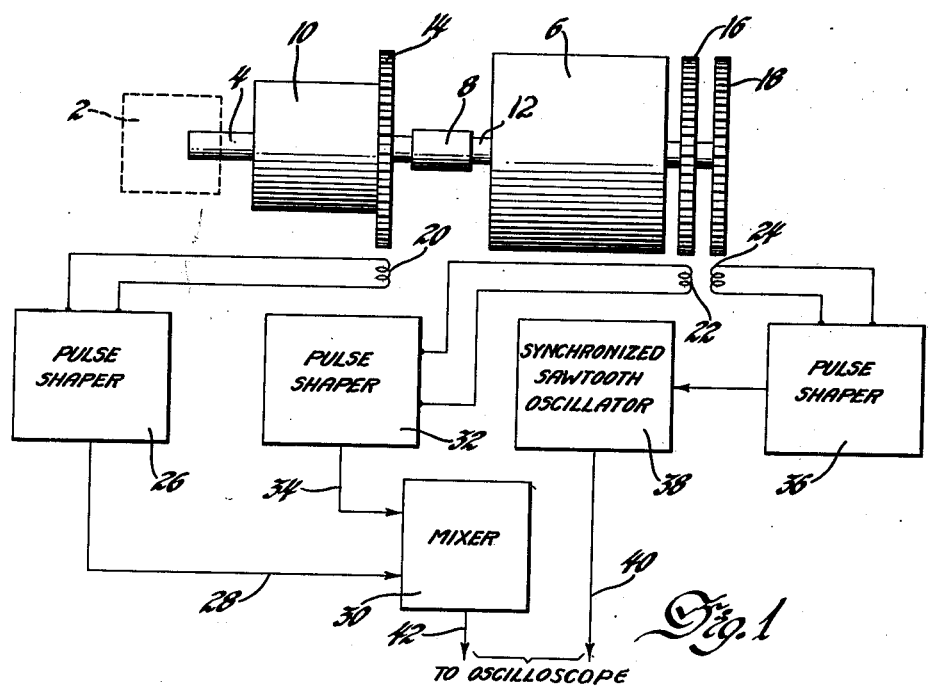
Figure 1 is a schematic block diagram showing a form of my invention.
Figure 4:
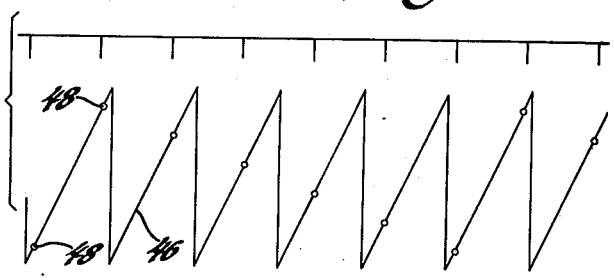
Figure 4 is a graph of a sawtooth wave form widely separated, generated in another portion of the system of my calibration circuit.

Figure 1 illustrates one application of the calibrating system which is the subject of this patent application. In this case, a torsiograph of any type (indicated by the dotted outline 2) is tested by subjecting it to a torsional oscillation excited by a mechanism indicated at 10, such, for example, as that illustrated in Figure 4 of Van Degrift #2,522,472, dated September 12, 1950. This is rotated, through flexible coupling 8, by motor 6. There are, of course, several ways in which variations in torsional speed are induced for test purposes.

The phase shift torsiograph previously referred to has, because of its inherent design, what might be called built-in calibration. In other words, the value of the height of each saw-toothed wave in degrees is determined by the spacing of the teeth in degrees. If, for example, 120 teeth are provided in the generating gear, each saw-toothed wave has a calibrated value of three degrees. Other factors, however, enter in, which may vary the theoretical calibrated figure due to, for example, imperfect shape of saw-toothed waves which might cause a correction factor to be introduced. Therefore, while no large error may be introduced, still for high accuracy it is desired to provide additional scale checking means.

To indicate the amplitude of vibration being applied, a phase shift torsiograph such as that shown in Patent #2,399,635 is operated simultaneously with the instrument being tested. In order to improve assurance of accuracy of the phase shift torsiograph thus being used, its usual arrangement is altered in a manner which illustrates the subject calibration method.

A gear 14 is driven by a motor 6 through shaft 12 and flexible coupling 8, and is therefore subject to any variations in torsional speed which are applied thereto and which appear in the shaft 4. On the driving side of motor 6 there is not intended to be any variation in amplitude, and the motor directly drives two gear wheels 16 and 18. The teeth of these various gear wheels 14, 16 and 18 are adapted to generate pulses by changing the magnetic fields of pick-up coils 20, 22 and 24 respectively as they rotate past the same. Pick-up coil 20 is connected to a pulse shaper 26, the pulse being fed through line 28 to mixer 30. Pick-up coil 22 is connected in like manner to a similar pulse shaper 32, and thence through conductor 34 to the mixer 30. Pick-up coil 24 is connected to a third pulse shaper 36, the output of which is fed to a synchronized saw-tooth oscillator 38, the output of the latter being connected through line 40 to the Y axis terminal of an oscilloscope. The mixer 30 has its output connected through line 42 to the Z axis or brightness control terminal of the same oscilloscope for controlling the beam intensity.

Figure 2:
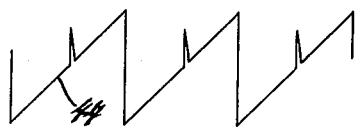
Figure 2 is a graph of a wave form generated in a portion of the system of my calibration means.
Figure 3:
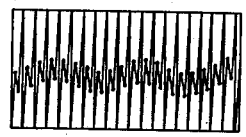
Figure 3 is a graph showing the standard pattern obtained in a test run of a torsiograph.

The number of teeth on the two gears 14 and 18 is identical and in one of the systems satisfactorily operated by me, 120 teeth were used and were satisfactory. This again, of course, is merely exemplary. On the other hand, gear 16 carries a proportionately different number of teeth in order to generate a series of progressive pulses in combination with one of the other gears, and as an example, 144 teeth were utilized for this gear in one of the systems. The gear wheel 18 with its associated pick-up coil 24, pulse shaper 36, and synchronized saw-tooth oscillator, corresponds to a portion of the torsiograph set forth in Patent #2,399,635, in that it provides a synchronized saw-tooth wave such as 22 in Figure 2. The only difference is that the pulse generated by the pickup 24 is now not used. This results in only a saw-toothed wave of the proper frequency being fed to the vertical deflector means of the oscilloscope. Superimposed upon this saw-tooth wave and at some intermediate position between the two ends as the trace appears on the oscilloscope, is a pulse generated by the gear 14 and transmitted by its pick-up coil 20 through the pulse shaper 26 and the mixer 30 to the Z axis terminal of the oscilloscope. This causes a spot to be formed on the saw-tooth wave whose vertical position depends upon the amount of torsional vibration present which, of course, is continuously changing and provides a wave form similar to that shown in Figure 3, where all of the saw-tooth waves are compressed more closely together and the superimposed pulses or bright spots (since this pulse controls the intensity of the beam) form the indicating wave.

Figure 5:
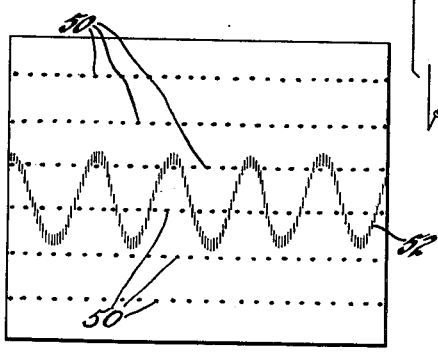
Figure 5 is a final resultant record showing the wave form obtained by test and calibration marks.

So far this operation corresponds to a torsiograph of the type previously described in my patent above identified, and any variation in the phase relation between shaft 12 and shaft 4 will show up to form a wave on the head of the cathode ray tube as distinguished from a straight line if no vibration is present. The flexible coupling permits a certain variation in shaft speed between the two and mechanism 10 induces such changes. By having shaft 4 connected to a torsiograph as before identified, if the two torsiographs are operating correctly, the readings on one should be identical with those on the other. Up to this point the pattern appearing on the screen is identical in principle to that of the previously mentioned patent. Therefore, the approximate inherent calibration also applies to this pattern. For further accuracy it is desired to incorporate some means for indicating directly to the operator exactly how much in angular degrees this deflection is. The pulses provided by the gear 16 are for this purpose and applied to the mixer through the pulse shaper 32 are likewise impressed upon the Z axis terminal of the oscilloscope, and control the beam intensity. As in the case of the pulses applied through the pick-up coil 20, they form bright spots on the zigzag saw-tooth wave at a regular series of positions controlled by the proportionality between the number of teeth in this gear and the others. This is more clearly shown on Figure 4, where the saw-tooth wave 46 alone is shown, having thereon a series of bright spots 48, whose position changes with geometric regularity, depending upon the ratio. If this series of saw-tooth waves is now compressed together, there will appear a series of horizontal dotted lines such as that shown on Figure 5 at 50, which are superimposed upon the wave 52, which is a trace of the torsional vibration. The saw-tooth wave does not show in Figure 5 as its luminosity is so much less than the others that it fades into the background. The vertical spacing between each one of these horizontal dotted lines is representative of a certain number of arcuate degrees in the shaft, and, therefore, by having the two patterns superimposed, the operator can read directly the number of arcuate degrees vibration that the unbalance forces in the shaft cause. Generalizing, the saw-tooth wave is provided and synchronized by the pulse generated by gear 18, and upon that saw-tooth wave there are impressed pulses by gear 14 which vary from a horizontal line, depending upon torsional vibration. This provides the irregular curve through the center of Figure 5 to define the torsional vibration. Simultaneously, gear 16 generates at a proportional rate, pulses which provide the series of horizontal dotted lines 50, indicating different arcuate distances, and thus enables the operator to directly and immediately ascertain how far the unbalance forces are causing the shaft to twist. Having thus obtained a much more accurate measurement of calibrator amplitude, one is in a position to determine the accuracy of any torsiograph which may be attached to shaft 4.

It is obvious that my method of superimposing a proportionate set of pulses to provide calibration lines could be used in a number of different installations, and that this disclosure, as applied to torsiograph means and using a cathode-ray oscilloscope, is merely illustrative.

I claim:

1. In calibrating and testing means for measuring torsional vibration in a rotating body, driving means, resilient means connecting the driving means to the body, pulse generating means driven by and subject to the vibration of the body, two pulse generating means directly driven by the driving means and insensitive to the vibration, said last named pulse means having different rates of pulse generation, pulse shaping means connected to each of the pulse generators, and a cathode ray oscilloscope having a plurality of control circuits, conductive means connecting the pulse shaping means connected to the pulse generating means subject to vibration of the body to one of the control circuits, and conductive means connecting one of the pulse shaping means connected to one of the pulse generating means driven by the driving means to said one of the control circuits of the oscilloscope, and further conductive means connecting the remaining pulse shaping means to another control circuit of the oscilloscope so that a series of superimposed signals will be applied to the screen.

2. In calibrating means for measuring the torsional vibration of a rotating body, driving means for rotating said body, an oscilloscope having vertical deflection means and intensity control means, oscillator means for generating a desired wave form connected to the vertical deflection means, a first pulse generator driven by said driving means and connected to the oscillator to control the same, a second pulse generator driven by the driving means, a third pulse generator driven by the body being tested and subject to the vibration thereof, and conductive means connecting the second and third pulse generating means to the intensity control means so that they will superimpose a double pattern on said wave form.

3. In calibrating means for measuring the torsional vibration of a rotating body, driving means for rotating said body, an oscilloscope having vertical deflection means and intensity control means, oscillator means for generating a desired wave form connected to the vertical deflection means, a first pulse generator driven by said driving means and connected to the oscillator to control the same, a second pulse generator driven by the driving means, a third pulse generator driven by the body being measured and subject to the vibration thereof, pulse shaping means connected to both the second and third pulse generating means and conductive means connecting each pulse shaping means to the intensity control of the oscilloscope to develop patterns thereon.

4. In calibrating means for measuring the torsional vibration of a rotating body, driving means, resilient connecting means between the driving means and the body to insulate the driving means from the torsional vibrations of the body, an oscilloscope having vertical deflection and intensity controls, wave generating means connected to the vertical deflection control of the oscilloscope, a pulse generator connected to the driving means and to the wave generator to control the same, a second pulse generator of the same frequency connected to the body and subject to the vibrations thereof, a third pulse generator having a set frequency difference to the first pulse generator connected to the driving means, connecting means for joining the second and third pulse generators to the intensity control for the oscilloscope.

5. In calibrating means for measuring torsional vibration of a rotating body driven by a driving means through a resilient connection, an oscilloscope having vertical deflection and intensity controls, wave generating means connected to the vertical deflector means, a plurality of pulse generators driven directly by the driving means and having different predetermined frequencies, connecting means between the wave generator and one of the pulse generators and between the intensity control means and another of said generators, a further pulse generator connected to the rotating body and subject to the vibrations thereof also connected to the intensity control means so that the wave generator synchronized with the drive provides a background pattern and the two pulse generators connected to the intensity control provide superimposed patterns thereon.

6. In calibrating means for indicating the torsional vibration of a rotating part, driving means for the part, resilient means between the driving means and the part to insulate the driving means from vibrations of the part, indicating means, a plurality of pulse generating means, one actuated by said part and subject to the vibration thereof, and the other actuated by the driving means, conductive means for connecting both pulse generators to the indicating means to provide indications of torsional vibration, and a further pulse generator actuated by the driving means and unaffected by vibrations of the part, having a different rate of pulse generation from the other pulse generator actuated by the driving means, and independently connected to the indicating means to provide calibration indicia.

7. In calibrating means for measuring the torsional vibration of a rotating body, driving means, resilient connecting means between the driving means and the body to insulate the driving means from the torsional vibrations of the body, an oscilloscope having vertical deflection and intensity controls, wave generating means connected to the vertical deflection control of the oscilloscope, a pulse generator connected to the driving means and to the wave generator to control the same, a second pulse generator of the same frequency connected to the body and subject to the vibrations thereof, a third pulse generator having a set frequency difference to the first pulse generator connected to the driving means, pulse shaping means connected to both the second and third pulse generating means, a mixing circuit connected to the output of both last-named pulse shaping means, and conductive means connecting the mixing means to the intensity control of the oscilloscope.

LAWRENCE F. HOPE.

References Cited in the file of this patent

UNITED STATES PATENTS

| Number | Name | Date |
|---|---|---|
| 2,208,648 | Schrader | July 23, 1940 |
| 2,399,635 | Hope | May 7, 1946 |